March 23, 1954 W. B. WHITNEY 2,673,176
METHOD OF SEPARATING COMPONENTS OF AN ORGANIC MIXTURE
Filed Dec. 20, 1948
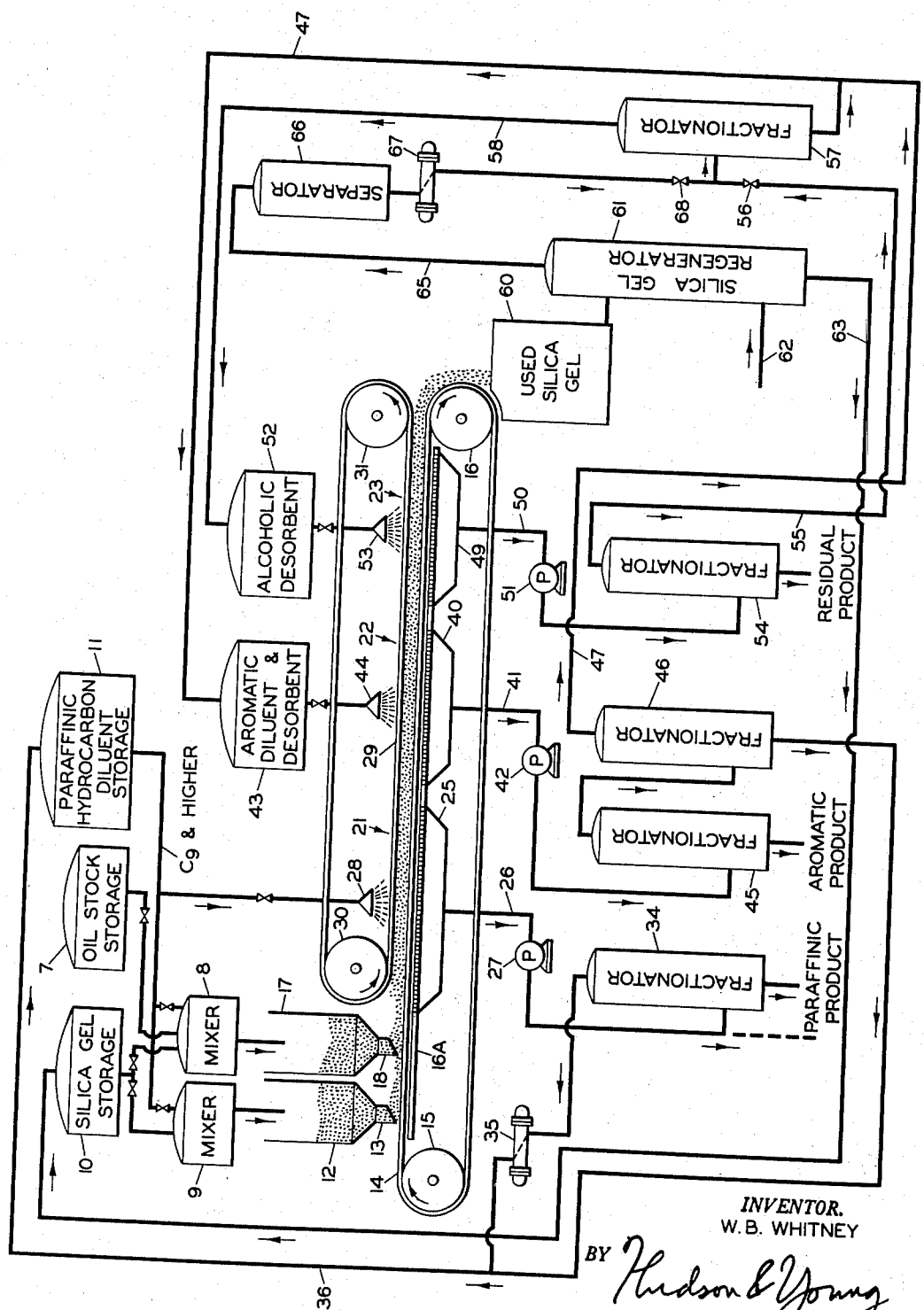
INVENTOR.
W. B. WHITNEY
BY Hudson & Young
ATTORNEYS Patented Mar. 23, 1954

2,673,176

UNITED STATES PATENT OFFICE 2,673,176

METHOD OF SEPARATING COMPONENTS OF AN ORGANIC MIXTURE

William B. Whitney, Bartlesville, Okla., assignor to Phillips Petroleum Company, a corporation of Delaware Application December 20, 1948, Serial No. 66,326

3 Claims. (Cl. 196—147)

This invention relates to a method of and apparatus for separating components of an organic mixture. In a more specific aspect, it relates to a method of and apparatus for separating a complex hydrocarbon, such as a lubricating oil stock, into paraffinic, aromatic, and residual fractions.

The separating by type of organic mixtures is of great importance in the chemical industries generally and particularly in petroleum refining. Heretofore, separation of components of hydrocarbon mixtures has been accomplished by treatment with sulfuric acid, clay, or aluminum chloride. In this type of treatment, a portion of the hydrocarbon mixture reacts with the treating reagent and must be discarded, as it cannot be economically recovered on a practical and commercial scale. It has also been proposed to separate such mixtures with such materials as phenol, furfural or propane. Phenol is a poisonous compound and must be handled with great care for obvious reasons. Solvents such as furfural or propane must be recovered and recycled in order to obtain economical operation, and this involves considerable difficulty in commercial processes.

It has also been proposed to separate components of organic mixtures through selective adsorption by compounds such as silica gel. The selective adsorption characteristics of this compound may be utilized, for example, in the separation of oxygenated derivatives of hydrocarbons after an oxidation step has been carried out. This results from the fact that the oxygenated derivatives are much more easily adsorbed by the silica gel than are the unreacted materials. Similarly, from the complex mixtures, such as produced by the Fischer-Tropsch synthesis or by cracking of paraffinic compounds, the various types of compounds present may be separated by selective adsorption.

Heretofore, such adsorption has been carried out almost entirely on a laboratory scale, in which the material to be separated is introduced at the top of a long column filled with silica gel, and one component of the mixture is selectively adsorbed by the gel as the mixture flows down through the column. This method is unsuitable for use on a practical and commercial scale since the adsorption takes place in a very narrow zone, approaching the dimensions of a geometric line. Accordingly, above the adsorption zone, the column is filled with spent silica gel which has adsorbed its maximum capacity of organic material from the mixture while, below the adsorption zone, the organic mixture contains only a negligible amount of material to be adsorbed so that little or no useful work is done in this lower section of the column. Thus, the material to be treated must flow through the entire column whereas the useful adsorption takes place only in a very small zone within the column.

It is an object of my invention to provide a method of and apparatus for separating components of organic mixtures by adsorption while avoiding the disadvantages heretofore encountered in such adsorption work.

It is a still further object of the invention to provide a method and apparatus for efficiently separating paraffinic, aromatic, and residual components of a hydrocarbon compound, such as a lubricating oil stock, in a continuous manner and on a practical and commercial scale.

It is still another object of this invention to provide a cyclic method for continuously handling large quantities of adsorption material, subjecting it to successive washings and desorptions, recovering the solvents, reactivating the adsorption material, and recycling the recovered solvents and reactivated adsorption material.

Various other objects, advantages and features of the invention will become apparent from the following detailed description taken in conjunction with the accompanying drawing, in which:

The figure is a flow diagram illustrating my novel method of hydrocarbon separation and disclosing apparatus for carrying out this method.

Referring now to the drawing in detail, the organic mixture to be treated is fed from storage tank 7 to mixing vessel 8. Preferably, the charge consists of a lubricating oil stock of high viscosity index having paraffinic, aromatic, and residual components, the term "residual components" in this application referring to materials such as resins, gums, and asphaltic bodies. Alternatively, the charge may consist of organic mixtures such as the reaction products from the Fischer-Tropsch synthesis, compounds produced by the cracking of paraffins to produce olefins, or a mixture of oxygenated and non-oxygenated hydrocarbon derivatives. Broadly speaking, the charge may consist of any suitable organic mixture in which one component may be selectively adsorbed by a suitable adsorbent material. In some cases, such as those in which olefins are being adsorbed, it may be desirable to operate at reduced temperatures to minimize chemical reactions, for example, polymerization of olefins. Temperatures below 10° F. have been found satisfactory in the case of olefins.

Adsorbent material from a vessel 10 may also be introduced into the mixing vessels 8 and 9, as desired. In the preferred embodiment of the invention, the adsorbent material used is silica gel but other adsorbent materials, such as charcoal, may be used which have selective adsorption characteristics for one or more components of the organic mixture to be treated. A paraffinic hydrocarbon diluent may also be introduced, as desired, into the mixing vessels 8 and 9 from a storage tank 11 so that, in the preferred embodiment, vessel 9 contains a mixture of silica gel and paraffinic hydrocarbon diluent while vessel 8 contains a mixture of silica gel, lubricating oil stock, and paraffinic hydrocarbon diluent. The proportions of these ingredients may be regulated as desired by the use of valves provided in the lines connecting the storage tanks with the mixing vessels. The function of the hydrocarbon diluent, which is preferably a paraffinic naphtha in which the molecules have nine or more carbon atoms, is to provide a slurry or paste which may be readily applied to an endless belt or filter cloth, in the manner hereinafter described and to dissolve the heavier paraffinic fraction of the oil stock. The diluent should also be of lesser specific gravity than the lubricating oil stock to be treated.

The composition of the final mixture provided in tanks 8 and 9 is not critical although the ratio of silica gel to oil stock should ordinarily be such that the proportion by weight of silica gel is from 8 to 10 times greater than the aromatic content of the lubricating oil to be treated although the proportion of silica gel may be reduced if a less highly refined product is desired. With other types of treating compounds, the proportions of ingredients may vary considerably and their ratios may be readily determined on an empirical basis. In some cases, the diluent from storage tank 11 may be eliminated if the character of the adsorbent and compound to be treated is such that a thick paste or slurry may be formed without the addition of a diluent compound.

Material from mixing vessel 9 is discharged into a container 12 which has a spreader 13 at its lower end to discharge the contents of the container in the form of a thin sheet upon an endless belt 14 of filter cloth which is carried by spaced pulleys 15 and 16 and supported by a plate 16a which may be solid under that portion of filter cloth where spreading takes place and perforated or slotted under that portion above suction boxes. The mixture from tank 8 is discharged into a container 17 which has a spreader 18 at its lower end similar to spreader 13. The spreader 18 discharges a second layer which is disposed above and in contact with the original or precoat layer produced by the spreader 13. The spreader 13 should be adjusted so as to produce an initial or precoat layer having a thickness of from ¼ to 4 inches. Although this thickness is not critical, the initial layer should be thin enough to permit liquid to flow through the layer during the interval taken by the filter cake to traverse one of the suction boxes to be described later. Further, the initial or precoat layer should be thick enough so that any adsorbable components passing through the upper layer will be quickly adsorbed by the lower layer before passing into one of the suction boxes.

Thus, the slurry discharged from the spreaders 13 and 18 forms a filter cake upon the cloth 14 and this filter cake is carried successively through treating zones 21, 22 and 23 as the pulleys 15, 16 are rotated in a clockwise direction. During the period when the feed stock is mixed with the adsorbent material in mixer 8 and container 17, and during the period when the filter cake passes from spreader 18 to the first treating zone 21, one type of component of the feed stock is selectively adsorbed by the adsorbent material mixed therewith. In the particular embodiment shown, the aromatic fraction of the lubricating oil stock is selectively adsorbed by the silica gel.

As the filter cake enters treating zone 21, it passes over a suction box 25 communicating with a line 26 and a suction pump 27 and, simultaneously, a spray of paraffinic diluent from storage tank 11 is directed against the filter cake through a spray head 28 which discharges liquid through an endless belt 29 carried by pulleys 30 and 31. The belt 29 is formed from filter cloth and its purpose is to prevent excessive agitation of the filter cake by the liquid material issuing from spray head 28. As a result, in treating zone 21, substantially all the unadsorbed components are dissolved or removed from the filter cake and any adsorbable components which were unadsorbed by the previous mixing or contacting treatment pass into the fresh precoat layer and are rapidly adsorbed thereby. Thus, in the preferred embodiment, substantially all the paraffinic components are removed from the filter cake by the spray of diluent from head 28, and any previously unadsorbed aromatic components pass into the precoat layer and are rapidly adsorbed thereby. It will be apparent that the diluent and materials washed out thereby traverse only a limited thickness of silica gel adsorbent before passing into suction box 25. The effluent from suction box 25 consists of unadsorbed components and paraffinic diluent and this effluent is passed to a fractionator 34 wherein it is separated into a bottom product of heavy paraffinic lubricating oils and a top product consisting of the lighter paraffinic diluent. This diluent is passed through a condenser 35 and recycled to the storage tank 11 through a conduit 36. The effluent withdrawn through conduit 26 may be given a second treatment with silica gel if a more highly refined product is desired.

The filter cake passing from treating zone 21 to treating zone 22 contains the bulk of the adsorbed component together with a small amount of diluent. Where a lubricating oil stock is treated, the silica gel adsorbent also contains residual products, such as resins, gums, and asphaltic bodies, together with the adsorbed aromatic products. In treating zone 22, the filter cake passes over a suction box 40 from which effluent is withdrawn through a conduit 41 by a suction pump 42. Simultaneously, the cake is treated with desorbent material which passes from a storage tank 43 through a spray head 44 and filter cloth 29 to the filter cake. The desorbent material displaces the components previously adsorbed from the feed stock and this displaced material passes into suction box 40. Where a lubricating oil stock is treated, the desorbent consists of an aromatic diluent, such as benzene, and a portion of this aromatic diluent displaces the heavier adsorbed aromatics and is retained in the filter cake while the remainder of the aromatic diluent passes into suction box 40. Accordingly, the effluent from suction box 40 consists of the desorbed components, such as aromatics, which are mixed with a certain quantity of the desorbent material itself and with a small or residual amount of the paraffinic diluent from treating zone 21. This effluent is charged to a fractionator 45 which separates it into a bottoms product consisting of the desorbed material which, in the embodiment shown, consists of the aromatic fraction of the charge stock. The overhead product from fractionator 45, which consists of a mixture of desorbent material and paraffinic diluent is charged to a second fractionator 46 from which a bottoms product, consisting of paraffinic diluent, is fed through line 36 to storage tank 11 and the overhead product consisting of the desorbent material, such as benzene, is fed through a line 47 to desorbent storage tank 43. Separation of the aromatic and paraffinic diluents in fractionator 46 may be substantially complete if the latter compound is a paraffinic naphtha containing 9 or more carbon atoms. The fractionated aromatic diluent, however, need not be entirely free from paraffinic diluent, as it is to be recycled and utilized to wash filter cake containing paraffinic diluent. Hence, the separation need only be complete enough to prevent excessive build up of the paraffinic component during continuous recycle.

In many cases, the filter cake passing from treating zone 22 may now be regenerated and recycled to adsorbent storage tank 10. However, when lubricating oil stock is to be treated, the filter cake passing from treating zone 22 contains valuable residual products, such as resins, in addition to the aromatic diluent sprayed onto the cake in treating zone 22. Accordingly, I provide the treating zone 23 in which the cake passes over a suction box 49 from which effluent is removed through a line 50 by a suction pump 51. A spray of alcoholic material, such as methyl alcohol, contacts the filter cake in this zone, the liquid passing from an alcoholic desorbent storage tank 52 through a spray head 53 and the filter cloth 29.

The alcoholic desorbent strips the residual products from the filter cake and replaces the aromatic diluent adsorbed by the silica gel in treating zone 22. Accordingly, the effluent from suction box 49 consists of aromatic diluent, alcoholic desorbent, and the residual products contained in the charge stock. This effluent is passed to a fractionator 54 from which a bottoms product is removed consisting of residual feed stock materials, such as resin, gum, and asphaltic bodies. The overhead product from fractionator 54, consisting of alcoholic and aromatic desorbents, is charged through a line 55 and a valve 56 to a fractionator 57 from which a bottoms product consisting of aromatic diluent is recycled to storage tank 43 through line 47 while an overhead product consisting of alcoholic desorbent is recycled through a line 58 to storage tank 52.

The filter cake leaving treating zone 23 contains alcoholic desorbent in addition to a very small amount of residual materials not removed in the previous treating zones. This cake drops into a container 60 as the filter cake passes over pulley 16 and it is charged to a regenerator 61 where it is contacted with a countercurrent stream of hot gases, which are admitted to the regenerator through a line 62. In the regenerator, the reactivated silica gel is removed as a bottoms product through line 63 and recycled to storage tank 10. The alcoholic desorbent is vaporized and passes overhead together with a small quantity of silica gel fines through a line 65 to a separator 66. The fines removed in separator 66 are normally discarded although, in some cases, they may be recycled to storage tank 10. The alcoholic desorbent from the separator is condensed by a unit 67 and passed through valve 68 to fractionator 57 wherein any residual aromatic diluent is removed as a bottoms product.

It is important that the bottoms produced from fractionator 57 be substantially free from alcoholic desorbent and, in some cases, further purification may be necessary before the material is recycled to storage tank 43. However, the alcoholic desorbent withdrawn through line 58 need not be especially free from aromatic desorbent since it is to be used in washing filter cake containing aromatic desorbent.

It will be apparent that I have disclosed a method and apparatus which is capable of wide use in separating components of organic mixture and particularly of hydrocarbon mixtures. In essence, the mixture to be treated is mixed with a substance which preferentially adsorbs one component of the mixture, and this mixture is formed into a slurry which is formed into a thin layer and passed successively through a plurality of treating zones. In these treating zones, unadsorbed materials are first removed by washing with an inert diluent of the same character as the unadsorbed component of the organic mixture, although preferably differing in boiling point to permit subsequent separation of the diluent from the unadsorbed product. Thereafter, the adsorbed component is replaced by a second diluent of the type which is preferentially adsorbed by the filter cake. The resulting mixture of diluent and of the adsorbed component is then separated, the adsorbed component being passed to product recovery and the diluent being recycled. In cases where lubricating oil stocks are treated, the cake is washed with alcoholic desorbent in a third treating zone to remove residual bodies and the alcoholic desorbent replaces the diluent from the second treating step, this alcoholic desorbent being recovered as the adsorption material itself is being regenerated. A substantial increase in efficiency is effected by providing a precoat layer so that any adsorbable components which are not adsorbed during the preliminary mixing stage pass into this fresh adsorbent layer and are immediately adsorbed thereby in the first treating zone. It is an important advantage of the process that it may be operated in a continuous manner and full advantage is taken of the adsorption characteristics of the materials used, an efficient system being provided for recovery and recycling of this adsorbent material.

While the invention has been described in connection with a present, preferred embodiment thereof, it is to be understood that this description is illustrative only and is not intended to limit the invention, the scope of which is defined by the appended claims.

Having described my invention, I claim:

1. The method of separating paraffinic, aromatic, and residual components of a lubricating oil stock which comprises mixing a paraffinic hydrocarbon diluent with silica gel adsorbent to form a slurry, forming said slurry into a thin layer, mixing said paraffinic hydrocarbon diluent, silica gel adsorbent, and the lubricating oil stock to be treated to form a second slurry, forming said second slurry into a thin layer above and in contact with the first layer, moving said layers successively through first, second and third treating zones, washing said layers with paraffinic hydrocarbon diluent in the first treating zone to remove unadsorbed components including paraffinic hydrocarbons, fractionating the effluent from the first treating zone to separate said hydrocarbon diluent from the unadsorbed hydrocarbons, washing said layers with an aromatic desorbent in the second treating zone to remove adsorbed aromatic hydrocarbons, fractionating the effluent from the second treating zone to separate a desorbed aromatic bottom fraction, fractionating the overhead product to separate aromatic diluent from residual paraffinic hydrocarbon diluent, washing said layers with an alcoholic desorbent in the third treating zone to remove residual products and aromatic desorbent, treating the effluent from the third treating zone to separate said alcoholic desorbent, said residual products, and aromatic desorbent, regenerating the silica gel adsorbent passing from the third treating zone and separating alcoholic desorbent therefrom, and recycling the paraffinic hydrocarbon diluent, the aromatic desorbent, the alcoholic desorbent, and the silica gel adsorbent from said treating zones.

2. The method of separating paraffinic and aromatic components of a lubricating oil stock which comprises mixing a paraffinic hydrocarbon diluent and silica gel adsorbent to form a slurry, forming said slurry into a thin layer, mixing an additional quantity of paraffinic hydrocarbon diluent and silica gel adsorbent with the lubricating oil stock to be treated to form a second slurry, forming said second slurry into a thin layer superimposed upon said first-mentioned thin layer, moving the superposed layers successively through a first treating zone and a second treating zone, spraying paraffinic hydrocarbon diluent on the upper layer in said first treating zone to remove unadsorbed materials therefrom and to cause selective adsorption of the aromatic components of said lubricating oil stock in the lower layer and spraying an aromatic desorbent on top of said upper layer in said second treating zone to remove adsorbed aromatic hydrocarbons from both layers.

3. The method of separating paraffinic and aromatic components of a lubricating oil stock which comprises mixing a paraffinic hydrocarbon diluent and silica gel adsorbent to form a slurry, forming said slurry into a thin layer, mixing an additional quantity of paraffinic hydrocarbon diluent and silica gel adsorbent with the lubricating oil stock to be treated to form a second slurry, forming said second slurry into a thin layer superimposed upon said first-mentioned thin layer, moving the superposed layers successively through a first treating zone, a second treating zone, and a third treating zone, spraying paraffinic hydrocarbon diluent on top of the upper layer in said first treating zone to remove unadsorbed materials from both layers and to cause adsorption of said aromatic components of the lubricating oil stock in the lower layer, spraying an aromatic desorbent on top of said upper layer in said second treating zone to remove aromatic hydrocarbons from both layers, and spraying an aromatic desorbent on top of said upper layer in said third treating zone to remove heavy residual components.

WILLIAM B. WHITNEY.

References Cited in the file of this patent

UNITED STATES PATENTS

| Number | Name | Date |
|---|---|---|
| 1,791,398 | Bleil | Feb. 3, 1931 |
| 2,034,784 | Wallny | Mar. 24, 1936 |
| 2,168,141 | Schutte | Aug. 1, 1939 |
| 2,185,868 | Schaefer | Jan. 2, 1940 |
| 2,341,045 | Kiersted | Feb. 8, 1944 |
| 2,441,572 | Hirschler et al. | May 18, 1948 |
| 2,470,339 | Claussen et al. | May 17, 1949 |
| 2,487,794 | Evans | Nov. 15, 1949 |